United States Patent
Murgai et al.

(10) Patent No.: US 12,334,067 B2
(45) Date of Patent: Jun. 17, 2025

(54) VOICE TRIGGER BASED ON ACOUSTIC SPACE

(71) Applicant: Apple Inc., Cupertino, CA (US)

(72) Inventors: Prateek Murgai, Palo Alto, CA (US); Ashrith Deshpande, San Jose, CA (US)

(73) Assignee: Apple Inc., Cupertino, CA (US)

( * ) Notice: Subject to any disclaimer, the term of this patent is extended or adjusted under 35 U.S.C. 154(b) by 255 days.

(21) Appl. No.: 17/883,224

(22) Filed: Aug. 8, 2022

(65) Prior Publication Data

US 2023/0062634 A1 Mar. 2, 2023

Related U.S. Application Data

(60) Provisional application No. 63/239,567, filed on Sep. 1, 2021.

(51) Int. Cl.
| | |
|---|---|
| *G10L 15/00* | (2013.01) |
| *G10L 15/16* | (2006.01) |
| *G10L 15/20* | (2006.01) |
| *G10L 15/22* | (2006.01) |
| *G10L 25/84* | (2013.01) |
| *H04R 1/40* | (2006.01) |
| *H04R 3/00* | (2006.01) |

(52) U.S. Cl.
CPC ............... *G10L 15/22* (2013.01); *G10L 15/16* (2013.01); *G10L 15/20* (2013.01); *G10L 25/84* (2013.01); *H04R 1/406* (2013.01); *H04R 3/005* (2013.01); *G10L 2015/223* (2013.01)

(58) Field of Classification Search
CPC ......... G10L 15/16; G10L 25/27; G10L 25/30; G10L 19/00; G10L 19/005; G10L 15/07; G10L 15/20; G10L 15/22; G10L 15/26; G10L 15/30; G10L 15/02; G10L 15/063; G10L 15/08; G10L 15/14; G10L 15/197; G10L 15/1815; G10L 15/12; G10L 25/78; G10L 25/87; G10L 21/0208

See application file for complete search history.

(56) References Cited

U.S. PATENT DOCUMENTS

| | | |
|---|---|---|
| 7,191,090 B1 | 3/2007 | Cunningham |
| 8,885,442 B2 | 11/2014 | Agevik et al. |

(Continued)

FOREIGN PATENT DOCUMENTS

| | | |
|---|---|---|
| KR | 20190096861 A | 8/2019 |
| KR | 20200009035 A | 1/2020 |

(Continued)

OTHER PUBLICATIONS

Examination Report under Section 18(3) for UK Application No. GB2211193.4 mailed Jan. 31, 2023, 2 pages.

(Continued)

*Primary Examiner* — Vu B Hang
(74) *Attorney, Agent, or Firm* — Aikin & Gallant, LLP

(57) ABSTRACT

A plurality of microphone signals can be obtained. In the plurality of microphone signals, speech of a user can be detected. A gaze of a user can be determined based on the plurality of microphone signals. A voice activated response of the computing device can be performed in response to the gaze of the user being directed at the computing device. Other aspects are described and claimed.

19 Claims, 6 Drawing Sheets

(56) References Cited

U.S. PATENT DOCUMENTS

| | | |
|---|---|---|
| 9,449,613 B2 | 9/2016 | Peters et al. |
| 9,734,845 B1 | 8/2017 | Liu et al. |
| 10,395,667 B2 | 8/2019 | Ebenezer |
| 10,410,651 B2* | 9/2019 | Lou .................... G10L 21/02 |
| 11,132,991 B2 | 9/2021 | Park et al. |
| 11,289,086 B2* | 3/2022 | Burton ................ G10L 15/08 |
| 11,482,217 B2* | 10/2022 | Golikov ............... G10L 25/78 |
| 11,508,378 B2 | 11/2022 | Kim et al. |
| 11,694,685 B2* | 7/2023 | Carbune ............. G10L 15/285 |
| | | 704/232 |
| 2012/0263020 A1 | 10/2012 | Taylor et al. |
| 2015/0333819 A1 | 11/2015 | Candelore |
| 2016/0234595 A1 | 8/2016 | Goran et al. |
| 2018/0294000 A1* | 10/2018 | Steele .................. G10L 25/84 |
| 2018/0336905 A1 | 11/2018 | Kim et al. |
| 2020/0312315 A1 | 10/2020 | Li et al. |
| 2021/0281965 A1 | 9/2021 | Malik et al. |

FOREIGN PATENT DOCUMENTS

| | | |
|---|---|---|
| KR | 20200052804 A | 5/2020 |
| WO | 2017138934 | 8/2017 |
| WO | 2018112643 | 6/2018 |

OTHER PUBLICATIONS

Search Report under Section 17 for UK Application No. GB2211193.4 mailed Jan. 31, 2023, 1 page.

Bryan, Nicholas J. , Impulse Response Data Augmentation and Deep Neural Networks for Blind Room Acoustic Parameter Estimation, Acoustics, Speech and Signal Processing (ICASSP), ICASSP 2020—2020 IEEE International Conference on, IEEE, May 2020, vol. 2020, No. 5, pp. 1-5.

* cited by examiner

VOICE TRIGGER BASED ON ACOUSTIC SPACE

CROSS-REFERENCE TO RELATED APPLICATION

This application claims the benefit of U.S. Provisional Patent Application No. 63/239,567 filed Sep. 1, 2021, which is incorporated by reference herein in its entirety.

BACKGROUND

Computing devices such as, for example, computers, speakers, televisions, smartphones, tablet computers, and appliances, can be prolific in day to day surroundings. Many such computing devices can be present in a shared space, such as a living room, kitchen, lobby, office, bedroom, or other enclosed space. Some computing devices have microphones that sense sounds. The microphones imprint the sensed sounds into microphone signals, where those sounds can be carried for further processing or storage.

SUMMARY

Computing devices can process microphone signals to detect sounds in the microphone signals. In some cases, an electronic device can process microphone signals to detect whether the microphones have picked up speech of a user. If speech is present, then a device can trigger a voice activated response, such as waking up from a sleep state, detecting or responding to a voice command, identifying a user, and/or other operations.

A space, such as a living room, kitchen, lobby, office, bedroom, or other enclosed area, can have multiple computing devices placed within it. It may be undesirable, however, to have every device trigger in response to a user's speech. Determining which device to trigger for voice-activated or "hands free" applications can be complicated. Thus, the sheer number of devices present in a single space can complicate voice-activated behavior of a device.

In addition, the spaces in which these devices are placed can be interconnected, which can further complicate the issue of which device should trigger. For example, different spaces can be connected through hallways, staircases, entry ways, door ways, cubical walls, and other openings that join spaces. Complexities in the user's space can lead to unintentional triggering of one or more devices in response to a user's speech.

In one aspect, a method, performed by a computing device, includes obtaining a plurality of microphone signals generated from a plurality of microphones, detecting, in the plurality of microphone signals, speech of a user, determining a gaze of a user based on the plurality of microphone signals, and triggering a voice activated response of the computing device in response to the gaze of the user being directed at the computing device. As such, the gaze of the user can be used as a stand-in for the user's intent. If the user is facing a device and speaking to it, then the device can assume that the user intends for it to respond.

In one aspect, a method, performed by a computing device, includes obtaining a plurality of microphone signals generated from a plurality of microphones, detecting, in the plurality of microphone signals, speech of a user, determining, with a trained neural network, whether the speech originates in a shared acoustic space with the computing device, and triggering a voice activated response of the computing device based on whether the speech originates in the shared acoustic space with the computing device. As such, a device that is in a different acoustic space from the user can ignore the user's speech.

An acoustic space can be understood as an enclosed space. As mentioned, different acoustic spaces can be interconnected. Different acoustic spaces can have different acoustic properties, such as how sound reflects in the acoustic space, the directions that the reflected acoustics take in the acoustic space, how sound decays in the acoustic space, how sound can be filtered relative to direction, and/or other acoustic properties that can characterize a room impulse response of the acoustic space. In some aspects, even in a shared space, such as a very large room, one region of the space and another region of the space can be treated as different acoustic spaces, based on if they have different acoustic properties.

In some aspects, a computing device is triggered based both on the gaze of the user and based on whether the speech originates in the shared acoustic space with the user. Thus, if multiple devices are present in interconnected spaces, a device that is in the same acoustic space and being gazed at by the user can trigger. A decision making system can gather information from multiple devices and determine which device is to trigger. For example, the decision making system can determine which device to trigger by shortlisting devices that are in the shared acoustic space with the user, and triggering the device that is on this shortlist and has the strongest indication that the user is gazing at the device. The other devices can ignore the speech.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
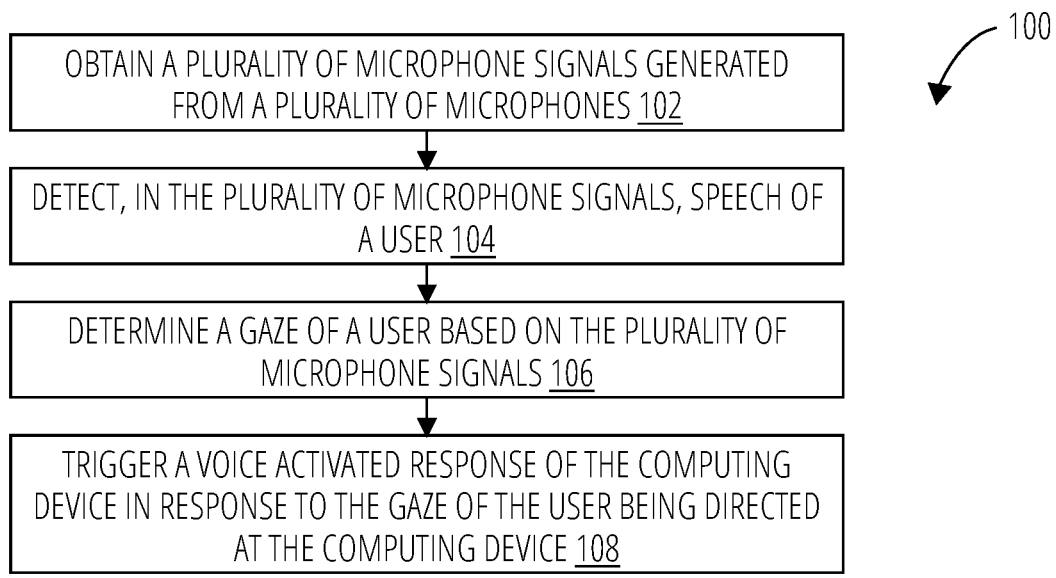
FIG. 1 shows a method for triggering a device based on acoustic gaze detection, in accordance with some aspects.

FIG. 1 shows a method for triggering a device based on acoustic gaze detection, in accordance with some aspects.

The method 100 can be performed with various aspects described. The method may be performed by hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof, which can be understood as a computing device or an electronic device. Although specific function blocks ("blocks") are described in the method, such blocks are examples. That is, aspects are well suited to performing various other blocks or variations of the blocks recited in the method. It is appreciated that the blocks in the method may be performed in an order different than presented, and that not all of the blocks in the method may be performed.

At block 102, a computing device can obtain a plurality of microphone signals generated from a plurality of microphones. The computing device can be a computer, a speaker (e.g., a smart speaker), a television, a smartphone, a tablet computer, an appliance, a media player, or other computing device.

The plurality of microphones can be native to the computing device (e.g., integrated within or on a housing of the computing device), or integrated with a separate computing device. The separate computing device, or the native computing device can serve as a decision making system, which can also obtain inputs from other computing devices which can be used to determine which of the computing devices should trigger, as described in other sections.

At block 104, the computing device can detect, in the plurality of microphone signals, speech of a user. For example, the computing device can apply a speech detection algorithm, which can also be understood as a voice activity detection (VAD) algorithm, to the microphone signals. Voice activity detection can be understood as a technique in which the presence or absence of human speech is detected. A VAD algorithm can extract features (for example, signal to noise ratio, line spectral frequencies, full band energy, low-band energy, zero-crossing rate, or other features) from one or more portions of the microphone signals and apply a classification rule to the features to classify whether or not the portion contains speech. A computing device can use varying VAD algorithms to detect speech without departing from the scope of the disclosure. The detection can be used to trigger a voice activated response. As described, multiple devices can be present in one or more spaces that can be interconnected, thus complicating the issue of which device should trigger.

At block 106, the computing device can determine a gaze of a user based on the plurality of microphone signals. For example, the computing device can analyze the speech of the user in each of the microphone signals to determine the gaze of the user. Gaze or acoustic gaze can be understood as a direction in which a user's head and mouth is pointing. This may be determined through acoustic sensing, without use of a camera. The user's gaze can be used as a stand-in for the user's intent. In some aspects, block 106 can be performed in response to the detection of the user's speech at block 104.

In some examples, determining the gaze of the user can include determining the direct to reverberant ration (DRR) using the plurality of microphone signals. The DRR can be understood as the ratio of the sound pressure level at a given location, of a direct sound from a directional source to the reverberant sound pressure level simultaneously incident to the same location.

The computing device can infer that the user's gaze is directed towards the microphones that sense the user's speech, when the DRR is high (e.g., above a threshold). When the user's gaze is directed toward the microphones, speech that is sensed by the microphones can have a large direct component, which can be understood as the speech that travels directly from the user to the microphones. Conversely, when the DRR is low (e.g., below a threshold), this indicates that the speech, and by inference, the user's gaze, is directed away from the microphone array. In such a case, rather than traveling directly to the microphones, most of the acoustic energy of the speech bounces off of one or more surfaces before being sensed by the microphones as reverberation.

The microphones can form a microphone array that is integral to the computing device, or to an external computing device. In the case of when the microphones are integrated within the local computing device, the gaze of the user can be determined to be directed at the computing device when the DRR satisfies a threshold. In the case of when the computing device acts as a decision maker for a plurality of computing devices, the gaze of the user can be determined to be directed at the computing device with the highest gaze confidence (e.g., a highest DRR).

For example, if a smart speaker with integrated microphones determines that a DRR satisfies a threshold DRR of value 'x', then the smart speaker can determine that the gaze of the user is directed towards the smart speaker. In another example, if a smart speaker is acting as a decision maker for one or more other devices, the smart speaker can determine the DRR of the detected speech from its own microphone signals, and obtain the DRR from the other devices. The smart speaker can then determine which of the devices, including itself, has the highest DRR. The smart speaker can direct the device with the highest DRR to trigger, which can be itself or one of the other devices.

In some aspects, determining the gaze of the user includes generating a plurality of acoustic pickup beams from the plurality of microphone signals and measuring direct and reverberant acoustic sound in the plurality of acoustic pickup beams. For example, each of the microphones can have a fixed relative position that together form a microphone array. The computing device can apply beamforming filters, which can also be understood as spatial filters, to the plurality of microphone signals. The applied filters create constructive and destructive interference between the microphone signals such that acoustic energy from some directions are emphasize while acoustic energy from other directions are de-emphasized. The positions at which the acoustic energy are emphasized can be understood as the acoustic pickup beams. If, for example, one or two of the acoustic pickup beams is picking up a dominant amount of speech compared to the other acoustic pickup beams, then this can indicate that some of the acoustic energy is directly from a source. The DRR can be determined as high and can satisfy a threshold indicating that the gaze of the user is directed towards the microphone array. Conversely, if the speech in each of the acoustic pickup beams does not substantially deviate from a mean of the speech or does not satisfy a threshold DRR, then this can indicate that the speech is being picked up by the microphone array from roughly all directions as reverberation, which in turn indicates that the user's gaze is likely directed away from the microphone array. Other audio processing techniques can be used to determine gaze of the user or DRR.

At block 108, the computing device can trigger a voice activated response of the computing device in response to the gaze of the user being directed at the computing device. In some aspects, if the gaze of the user is not directed at the computing device (e.g., the gaze confidence is lower than that of other computing devices, and/or the gaze confidence is below a threshold), then the computing device does not trigger the voice activated response. A voice activated response can include an operation performed by the computing device that was not being performed prior to the triggering.

For example, the computing device can trigger a wake-up of the computing device. Devices can operate in a sleep mode in which processing of operations are limited. When the device is triggered, it can enter a wake-up mode and trigger other operations to be performed such as, for example, turning on a screen, processing microphone signals with added speech recognition capabilities, or perform other operations not performed in the sleep mode.

Additionally, or alternatively, the voice activated response can include processing the speech to detect a voice command. For example, based on the gaze of the user being directed at the computing device, the computing device can apply one or more automatic speech recognition (ASR) algorithms to the microphone signals to detect whether a voice command, for example 'play music', or 'take me home' is present in the speech. The computing device can then respond to the voice command by performing additional operations such as launching a music playing application, a navigation application, or other application, depending on the detected voice command. In some examples, the computing device can apply a voice recognition algorithm to the speech to identify the user from which the speech originates. For example, the computing device can compare the sensed speech to known speech signatures to determine a match. The computing device can perform one or more operations based on identifying the user. For example, user settings or preferences (e.g., preferred audio or content settings) that are associated with the identified user can be used to tailor the response to the user.

Figure 2:
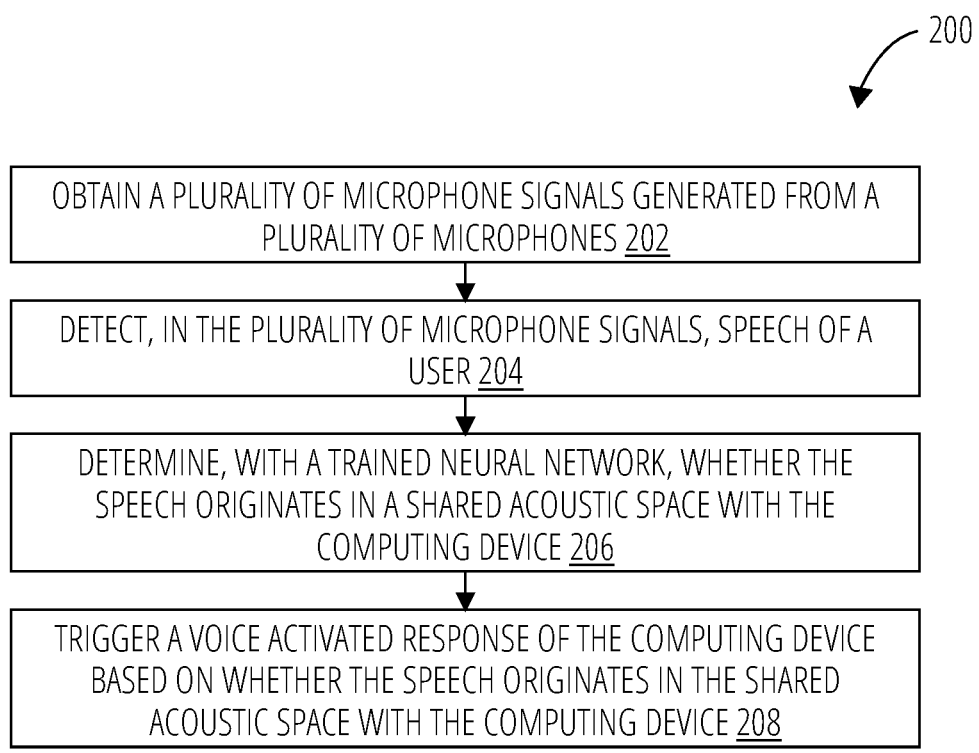
FIG. 2 shows a method for triggering a device based on a shared acoustic space, in accordance with some aspects.

FIG. 2 shows a method for triggering a device based on acoustic gaze detection, in accordance with some aspects. The method 200 can be performed with various aspects described. The method may be performed by hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof, which can be understood as a computing device or an electronic device. Although specific function blocks ("blocks") are described in the method, such blocks are examples. That is, aspects are well suited to performing various other blocks or variations of the blocks recited in the method. It is appreciated that the blocks in the method may be performed in an order different than presented, and that not all of the blocks in the method may be performed.

At block 202, a computing device can obtain a plurality of microphone signals generated from a plurality of microphones. The microphones can form a microphone array that is integrated within a shared housing of the computing device, however, it should be understood that aspects of this method are also applicable to when a computing device gathers information from a plurality of computing devices and determines which of the computing devices to trigger, as described in other sections.

At block 204, a computing device can detect, in the plurality of microphone signals, speech of a user, as described in other sections. Speech can refer to spoken language or other sound (e.g., a cough, whistle, or other sound) that is uttered from a user's mouth.

At block 206, the computing device can determine, with a trained neural network, whether the speech originates in a shared acoustic space with the computing device. An acoustic space can be understood as shared when objects experience acoustic energy in a similar manner. For example, an acoustic energy travels differently in different acoustic spaces. This can include how the sound bounces around in the room, how sound is absorbed from different directions in the room, how fast it decays, other sounds that are present in the acoustic space, reverberation time, and other acoustic properties that can characterize a room impulse response. In some aspects, block 206 can be performed in response to speech being detected at block 204.

Further, if a room (e.g., an office) is large and has different surface materials, furniture, geometry, or other factors that can affect the acoustic response of a sound, then that room may have regions that are treated as different acoustic spaces. Typically, one room (e.g., a bedroom) can have different acoustic properties than another room (e.g., a living room), due to the different geometry of the room, objects and furniture in the room, surface materials, or other factors that affect the acoustic response of sound in those rooms.

The trained neural network can receive as input, the raw microphone signals or features extracted from the raw microphone signals. The trained neural network can output a confidence score that indicates whether the speech is originating in the shared acoustic space with the computing device. In some aspects, the trained neural network can perform binary classification, for example, by outputting a '1' to indicate that the user is located within a shared acoustic space as the microphone array, or a '0' to indicate that the user is located in a different acoustic space and not within the shared acoustic space. In some aspects, the trained neural network can output a continuous score, for example, a score from '0' to 'x' with '0' indicating the lowest confidence that the user is located in the shared acoustic space and 'x' indicating the highest confidence that the user is located in the shared acoustic space.

The trained neural network can include a deep neural network (DNN) with a first layer of nodes that receives the microphone signals or features extracted therefrom as input. The DNN can include N layers of nodes. Each of the nodes can compute an activation function that passes a result to one or more nodes in a next layer. Connections between the nodes can be weighted to determine the influence of the connection to the next node. During the training phase, these weights can be updated iteratively with a training data set. The training data set can include speech in a room as well as other sounds in the same room or a different room. For example, the training data set can include sound that is produced by speakers of the computing device, and picked up by the microphone array of the computing device, as well speech of a user in the same space or a different space as the computing device. The computing device can provide a guess (the output) as to whether or not the speech is in the same space as the computing device. Feedback can be provided to the neural network in what can be understood as backpropagation, to tune the weights so that the neural network guesses correctly whether the room occurs in the same acoustic space as the microphone array or in a different acoustic space. This process can be repeated for many examples that are present in the training set. In such a manner, the weights can be optimized such that the trained neural network can detect when speech is originating in the same acoustic space or a different acoustic space from the array of microphones.

At block 208, the computing device can trigger a voice activated response of the computing device based on whether the speech originates in the shared acoustic space with the computing device. As discussed with regard to FIG. 1, the voice activated response can include a wake-up of the computing device, detecting a voice command in the speech, responding to a voice command in the speech, and/or determining an identity of the user based on the speech. As such, the computing device can ignore speech of a user when the user is in a different space, but respond to the user when the speech is in the same space as the device. As discussed, in some aspects, the computing device can be one of a plurality of computing devices that sense the speech. In such a case, a selected one of the plurality of computing devices can be triggered in response to determining that the speech originates in the shared acoustic space with the selected one of the plurality of computing devices. The other computing devices that are in a different acoustic space from the user can ignore the speech.

In some aspects, operations described using speech of a user can be performed based on non-speech sounds picked up in the environment. For example, method 200 can be performed based on non-speech sounds picked up in the plurality of microphones. For example, at block 204, the method can detect a sound in the environment such as, for example, from a window or door, a clock, a television, or other sound in the environment. At block 206, the method can determine whether the sound originates in a shared acoustic space with the computing device. At block 208, the method can trigger a response such as any of the voice activated responses, or a different response, based on whether the sound originates in the shared acoustic space with the device.

In some examples, aspects of FIG. 2 and FIG. 1 can be combined. For example, a computing device can trigger the voice activated response based on a determination that the speech originates in the shared acoustic space with the selected one of the plurality of computing devices, and based on a determination that the gaze of the user is directed at the selected one of the plurality of computing devices. For example, the devices that are in the shared acoustic space can be shortlisted to determine which should trigger. Of those devices, the devices that the user's gaze is most directed towards (e.g., with a highest DRR) can be triggered. In such a manner, if multiple devices are in the same space, then the device that the user is gazing at within the space will trigger, so that a user does not become overwhelmed with multiple devices triggering. Devices in a different space and/or that are not the subject of the user's gaze can simply ignore the speech.

Figure 3:
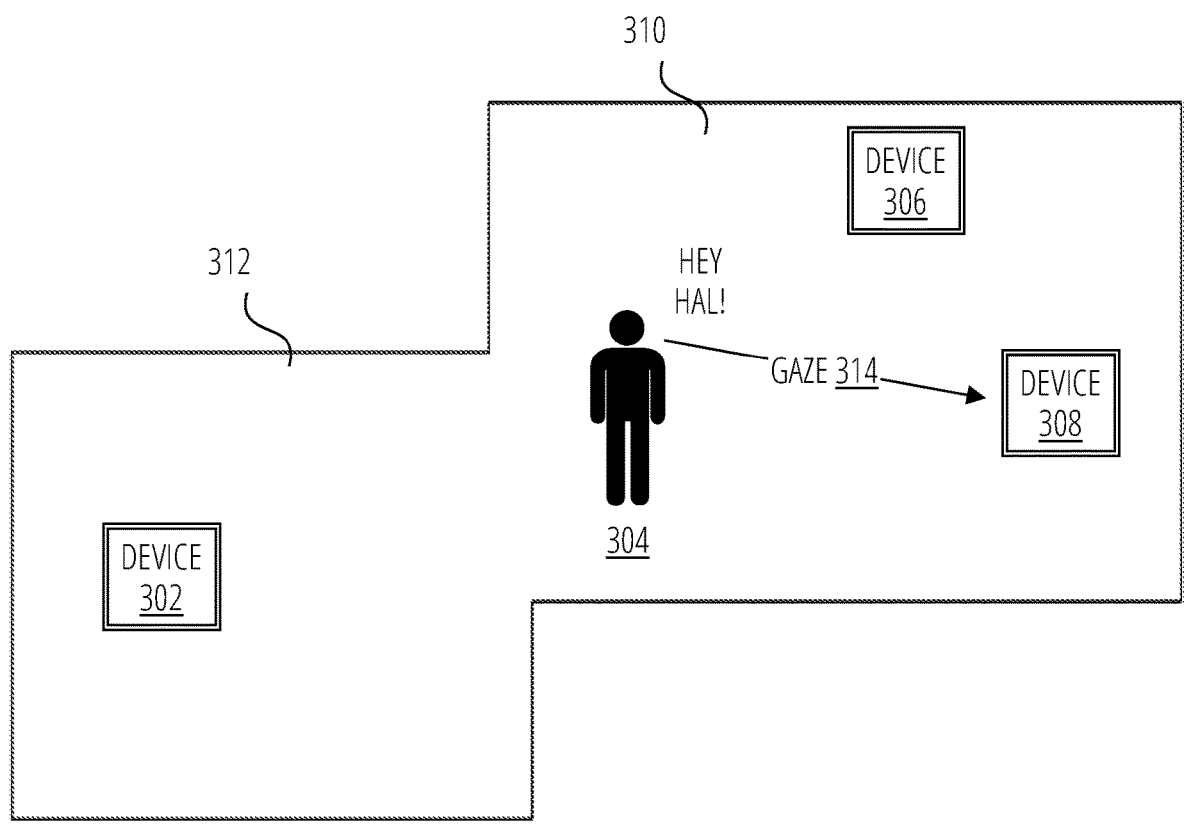
FIG. 3 illustrates an example scenario for triggering a device, in accordance with some aspects.

FIG. 3 illustrates an example scenario for triggering a device, in accordance with some aspects. In this scenario, a user 304 can be located in an acoustic space 310. Acoustic space 310 can be connected to a second acoustic space 312 through an opening which can be a doorway, a hallway, an entry way, or other opening. Although shown as rooms with four walls, it should be understood that an acoustic space can have varying geometry and size. For example, walls can be form non-rectangular shapes, walls and ceilings can be curved, and objects such as furniture, appliances, coverings, and more can be arranged in rooms.

Device 306 and device 308 can both be located in the same acoustic space 310 as the user 304. Device 302 can be located in the second acoustic space 312. These computing devices can each sense sound through a respective microphone array. In this scenario, the user has a gaze 314 that is directed to device 308. The user mutters a phrase, for example, 'Hey Hal' which is intended by the user to elicit a voice activated response from device 308.

The device 302 can detect the user's speech in its microphone array. The device 302 can determine that the user is in a different acoustic space and ignore the user's speech, 'Hey Hal'. In some aspects, the device 302 need not determine the gaze of the user, given that the device is already deemed to be in a different space.

Similarly, device 306 and device 308 can detect the user's speech in its respective microphone array. In this example, both device 306 and device 308 can determine that the user is in the shared acoustic space 310. Device 308 and device 306 can independently determine the gaze 314 of the user, from the perspective of their respective microphone arrays.

The device 306 can deem that the gaze is not directed at device 306 based on a threshold and/or a gaze confidence comparison with other devices such as device 308. Device 308 can determine that the gaze is directed at device 308, which can be based on a threshold, and/or a gaze confidence comparison with the other devices such as device 306. As a result, device 308 can trigger a voice activated response in response to the user's speech 'Hey Hal', while device 306 does not trigger. In some aspects, the devices can share information (e.g., gaze confidence, an acoustic space classification, and/or reverberation times) by communicating with each other over a network, as described in other sections. In some aspects, the user's speech can contain a trigger phrase which can be understood as a limited vocabulary that can be recognized by the computing device during a reduced capability mode (e.g., a sleep mode), that when detected, triggers a voice activated response, such as a wake up.

Figure 4:
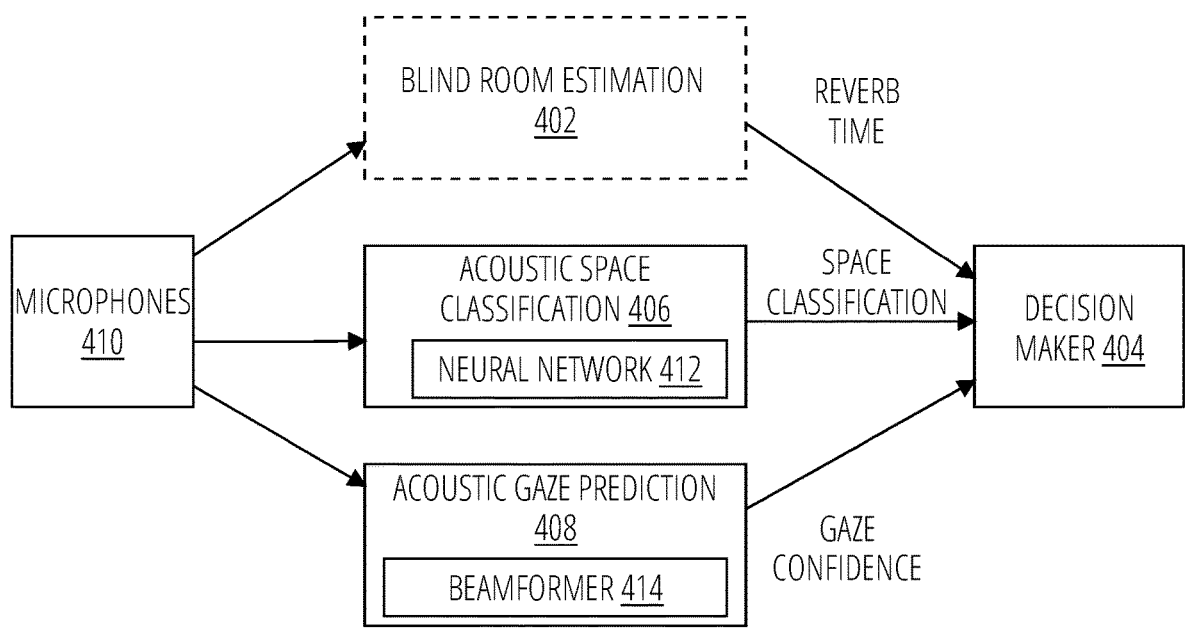
FIG. 4 illustrates a system and workflow for triggering a device, in accordance with some aspects.

FIG. 4 illustrates a system and workflow for triggering a device, in accordance with some aspects. Microphones 410 can form a microphone array for a respective computing device.

At block 406, the computing device can perform acoustic space classification. As discussed, an artificial neural network 412 such as a DNN can process the microphone signals to output a confidence score (e.g., a high confidence or a low confidence) that indicates when the user is in the same space as the device. The confidence score can be understood as an acoustic space classifier such that the value of the score classifies whether or not the computing device is in the shared acoustic space with the user. As described in other sections, the neural network can be trained to detect information relating to directional reflections, decays, and other acoustic response of the space, that it uses to detect whether or not the speech is originating in the shared acoustic space with the device.

At block 408, the computing device can analyze the speech in the microphone signals to perform acoustic gaze prediction. As discussed in other sections, the device can estimate the DRR using the microphone signals on the device to make a prediction of whether the user is looking in the direction of the device. The higher the DRR, the more confidently the device can predict that the user's gaze is directed at the device. Conversely, the lower the DRR, the more confidently the device can predict that the user's gaze is not directed at the device. Thus, the DRR can be used as a confidence score indicating the user's gaze. The DRR can be determined based on beamforming. A beamformer 414 can apply spatial filters to the microphone signals to form acoustic pickup beams that measure the DRR as described in other sections. The DRR can be determined for different sub-bands.

At block 402, which is an optional block, the computing device can perform blind room estimation using one or more microphone signals. This technique, which can be performed with a single microphone signal, can blindly estimate reverberation time for different sub-bands from a far-field sound source. Different acoustic spaces can have varying reverberation times in different sub-bands, based on differences in volume, geometry, objects within the space, and/or surface materials of the space. As such, this information can be used to tag each device with the sub-band reverberation time of the acoustic space that the device is located within. This information can be kept (e.g., in computer memory) and recursively used in future triggers to verify whether a device/devices exists in the same acoustic space or has moved, by comparing future estimated reverberation times to the ones from the past. Thus, the reverberation time can be determined at this block 402, and used for future trigger events to track the acoustic space of the computing device. For example, when speech is detected by a first device, the first device can perform operations of block 406 but may have trouble determining with high confidence, whether or not the user is in the shared acoustic space with the first device. The decision making device can corroborate the reverberation time of the first device with a second device based on having same or similar sub-band reverberation time. The decision making system can then determine whether or not the first device is in the same space as the user based on whether or not the second device is in the shared acoustic space with the user.

Each of the blocks 406, 408, and 402 can be performed using microphone signals generated by the microphone array of the respective computing device. The outputs of each block can be obtained at block 404 by a decision making device, which can be any of the respective computing devices, or a separate computing device. At block 404 the decision making device can obtain, from each of one or more computing devices, a) an indication of a gaze of a user relative to a respective one of the one or more computing devices (e.g., a DRR value or a confidence score), and/or b) an indication of whether the speech originates in a shared acoustic space with the respective one of the one or more computing devices (e.g., an acoustic space classifier or a confidence score output by the neural network of the respective device). The decision making device can select one of the one or more computing devices to trigger a voice activated response based on the gaze indication and the acoustic space indication. For example, the decision making device can select from the one or more computing devices those that indicate that they are in the shared acoustic space with the user. From those shortlisted computing devices, the decision making device can select the device that has the highest gaze confidence.

Figure 5:
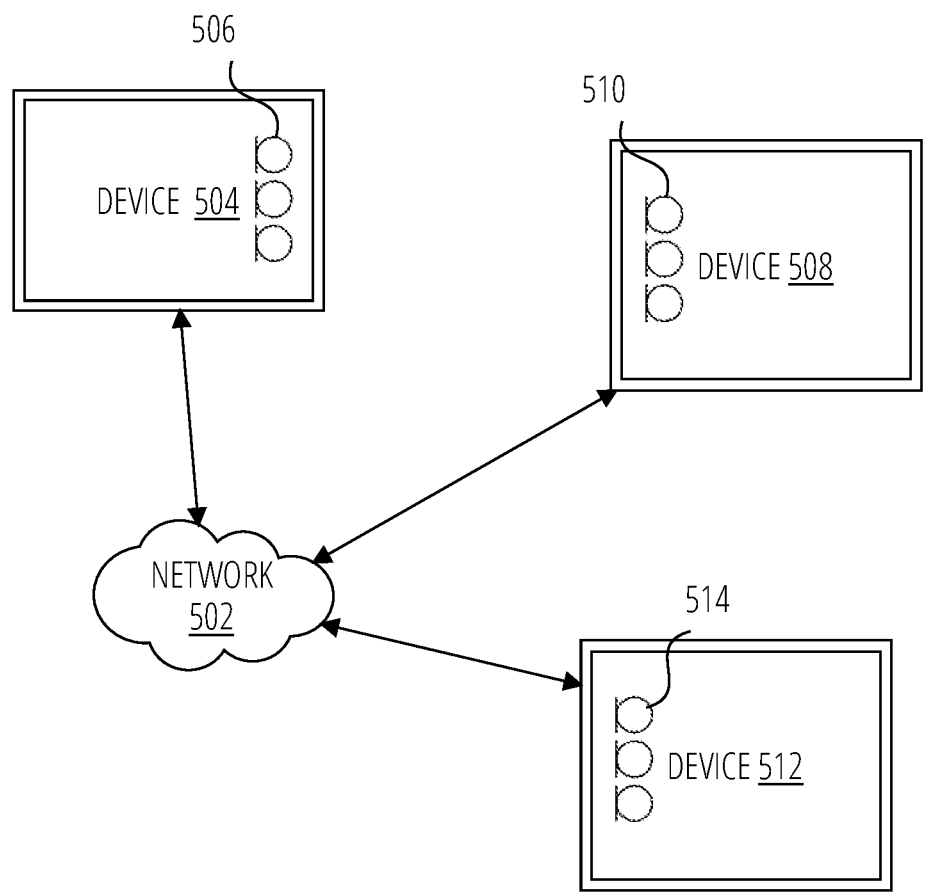
FIG. 5 illustrates a plurality of computing devices in communication to determine triggering, in accordance with some aspects.

For example, referring to FIG. 5, a device 504 can process microphone signals from its microphone array 506 to determine a confidence score for user's gaze and a confidence score indicating whether it is in a shared acoustic space with the user. Separately, device 508 can process microphone signals from its microphone array 510 to determine a confidence score for user's gaze and a confidence score indicating whether it is in a shared acoustic space with the user. Also separately, device 512 can process microphone signals from its microphone array 514 to determine a confidence score for user's gaze and a confidence score indicating whether it is in a shared acoustic space with the user. These confidence scores can be obtained by device 504 which can be designated as the decision making device.

For example, the devices can communicate over network 502 to share the confidence scores with the decision making device. The decision making device can communicate to the devices over the network as to which of them is to trigger. The network can be a wired and/or wireless network. Devices can communicate using one or more network protocols such as, for example, TCP/IP, Ethernet, Wi-Fi, LTE, 3G, 4G, 5G, or other network communication protocol.

In some aspects, more than one device can assume the role of a decision making device. In some aspects, each of them can individually decide whether or not to trigger based on satisfying a gaze threshold and/or when the device is in the shared acoustic space. Thus, in some aspects, the devices need not pool their information to decide whether or not to trigger a response to the user's speech.

Figure 6:
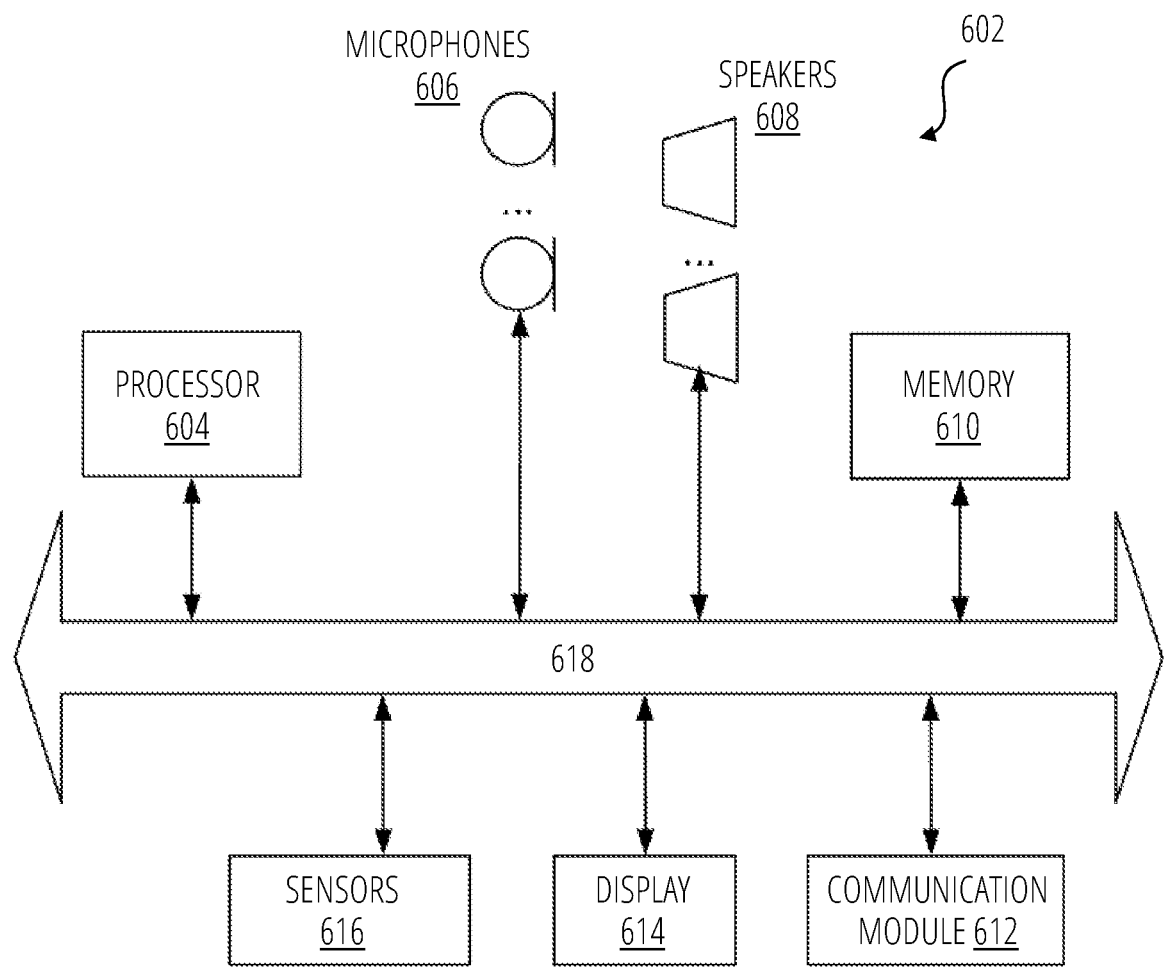
FIG. 6 illustrates an example of an audio processing system, in accordance with some aspects.

FIG. 6 illustrates an example computing device 602, which can be understood as an audio processing system, in accordance with some aspects. The audio processing system can be a computing device such as, for example, a desktop computer, a tablet computer, a smart phone, a computer laptop, a smart speaker, a media player, a household appliance, a headphone set, a head mounted display (HMD), smart glasses, an infotainment system for an automobile or other vehicle, or other computing device. The system can be configured to perform the method and processes described in the present disclosure.

Although various components of an audio processing system are shown that may be incorporated into headphones, speaker systems, microphone arrays and entertainment systems, this illustration is merely one example of a particular implementation of the types of components that may be present in the audio processing system. This example is not intended to represent any particular architecture or manner of interconnecting the components as such details are not germane to the aspects herein. It will also be appreciated that other types of audio processing systems that have fewer or more components than shown can also be used. Accordingly, the processes described herein are not limited to use with the hardware and software shown.

The audio processing system can include one or more buses 618 that serve to interconnect the various components of the system. One or more processors 604 are coupled to bus as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 610 can include Read Only Memory (ROM), volatile memory, and non-volatile memory, or combinations thereof, coupled to the bus using techniques known in the art. Sensors 616 can include an IMU and/or one or more cameras (e.g., RGB camera, RGBD camera, depth camera, etc.) or other sensors described herein. The audio processing system can further include a display 614 (e.g., an HMD, or touch-screen display).

Memory 610 can be connected to the bus and can include DRAM, a hard disk drive or a flash memory or a magnetic optical drive or magnetic memory or an optical drive or other types of memory systems that maintain data even after power is removed from the system. In one aspect, the processor 604 retrieves computer program instructions stored in a machine readable storage medium (memory) and executes those instructions to perform operations described herein.

Audio hardware, although not shown, can be coupled to the one or more buses in order to receive audio signals to be processed and output by speakers 608. Audio hardware can include digital to analog and/or analog to digital converters. Audio hardware can also include audio amplifiers and filters. The audio hardware can also interface with microphones 606 (e.g., microphone arrays) to receive audio signals (whether analog or digital), digitize them when appropriate, and communicate the signals to the bus.

Communication module 612 can communicate with remote devices and networks through a wired or wireless interface. For example, communication module can communicate over known technologies such as TCP/IP, Ethernet, Wi-Fi, 3G, 4G, 5G, Bluetooth, ZigBee, or other equivalent technologies. The communication module can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses can be connected to each other through various bridges, controllers and/or adapters as is well known in the art. In one aspect, one or more network device(s) can be coupled to the bus. The network device(s) can be wired network devices (e.g., Ethernet) or wireless network devices (e.g., WI-FI, Bluetooth). In some aspects, various aspects described (e.g., simulation, analysis, estimation, modeling, object detection, etc.,) can be performed by a networked server in communication with the capture device.

Various aspects described herein may be embodied, at least in part, in software. That is, the techniques may be carried out in an audio processing system in response to its processor executing a sequence of instructions contained in a storage medium, such as a non-transitory machine-readable storage medium (e.g. DRAM or flash memory). In various aspects, hardwired circuitry may be used in combination with software instructions to implement the techniques described herein. Thus the techniques are not limited to any specific combination of hardware circuitry and software, or to any particular source for the instructions executed by the audio processing system.

In the description, certain terminology is used to describe features of various aspects. For example, in certain situations, the terms "module", "processor", "unit", "renderer", "system", "device", "filter", "reverberator", "block", "tracker", "simulator" and "component", are representative of hardware and/or software configured to perform one or more processes or functions. For instance, examples of "hardware" include, but are not limited or restricted to an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain aspects have been described and shown in the accompanying drawings, it is to be understood that such aspects are merely illustrative of and not restrictive, and the disclosure is not limited to the specific constructions and arrangements shown and described, since various other modifications may occur to those of ordinary skill in the art.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method, performed by a computing device, comprising:
    obtaining a plurality of microphone signals generated from a plurality of microphones;
    detecting, in the plurality of microphone signals, speech of a user;

determining whether the speech is originating in a shared acoustic space with the computing device based on the plurality of microphone signals;

determining an acoustic gaze of the user based on the plurality of microphone signals, wherein the acoustic gaze comprises a direction in which a head and mouth of the user is pointing with respect to the computing device; and triggering a voice activated response of the computing device in response to a determination that the speech originates in the shared acoustic space with the computing device and the acoustic gaze of the user being directed at the computing device.

2. The method of claim 1, wherein determining the acoustic gaze of the user includes estimating a direct to reverberant ratio (DRR) using the plurality of microphone signals.

3. The method of claim 2, wherein the acoustic gaze of the user is determined to be directed at the computing device when the DRR satisfies a threshold or when the DRR is higher than a second DRR that is determined from microphone signals of a second device.

4. The method of claim 1, wherein determining the acoustic gaze of the user includes generating a plurality of acoustic pickup beams from the plurality of microphone signals and measuring direct and reverberant acoustic sound in the plurality of acoustic pickup beams.

5. The method of claim 1, wherein determining, whether the speech is originating in the shared acoustic space with the computing device is performed based on a trained neural network.

6. The method of claim 5, wherein the trained neural network is trained to output a confidence score that indicates whether the speech is originating in the shared acoustic space with the computing device.

7. The method of claim 5, wherein the computing device is one of a plurality of computing devices that sense the speech, and a selected one of the plurality of computing devices is triggered in response to:

determining that the speech originates in the shared acoustic space with the selected one of the plurality of computing devices, and determining that the acoustic gaze of the user is directed at the selected one of the plurality of computing devices.

8. The method of claim 1, further comprising performing blind room estimation using at least one of the microphone signals to determine reverberation time of an acoustic space of the computing device, wherein the reverberation time is used to track the acoustic space of the computing device.

9. The method of claim 1, wherein the voice activated response includes at least one of: a wake-up of the computing device, processing the speech to detect a voice command, responding to a voice command in the speech, or determining an identity of the user based on the speech.

10. A processor of a computing device, the processor configured to:

obtain a plurality of microphone signals generated from a plurality of microphones;

detect, in the plurality of microphone signals, speech of a user;

determine, with a trained neural network, whether the speech originates in a shared acoustic space with the computing device based on the plurality of microphone signals;

determine an acoustic gaze of the user based on the plurality of microphone signals, wherein the acoustic gaze comprises a direction in which a head and mouth of the user is pointing with respect to the computing device; and triggering a voice activated response of the computing device in response to a determination that the speech originates in the shared acoustic space with the computing device and the acoustic gaze of the user being directed at the computing device.

11. The processor of claim 10 determines whether the speech originates in the shared acoustic space as output of a trained neural network responsive to input based on the plurality of microphone signals, wherein the trained neural network is trained to output a confidence score indicating whether the speech is originating in the shared acoustic space with the computing device.

12. The processor of claim 10, wherein the voice activated response of the computing device is not triggered when the speech does not originate in the shared acoustic space with the computing device.

13. The processor of claim 10, wherein the acoustic gaze of the user is determined by estimating a direct to reverberant ratio (DRR) using the plurality of microphone signals.

14. The processor of claim 13, wherein the acoustic gaze of the user is determined to be directed at the computing device when the DRR satisfies a threshold or when the DRR is higher than a second DRR that is determined from microphone signals of a second device.

15. The processor of claim 13, wherein estimating the DRR includes generating a plurality of acoustic pickup beams from the plurality of microphone signals and measuring direct and reverberant acoustic sound for each of the plurality of acoustic pickup beams.

16. The processor of claim 10, wherein the computing device is one of a plurality of computing devices, and a selected one of the plurality of computing devices is triggered based on:

a determination that the speech originates in the shared acoustic space with the selected one of the plurality of computing devices, and a determination that the acoustic gaze of the user is directed at the selected one of the plurality of computing devices.

17. The processor of claim 10, wherein the voice activated response includes at least one of: a wake-up of the computing device, detecting a voice command in the speech, responding to a voice command in the speech, and determining an identity of the user based on the speech.

18. A method, performed by a computing device, comprising:

obtaining, from each of one or more computing devices, an indication of an acoustic gaze of a user relative to a respective one of the one or more computing devices and an indication of whether speech of the user originates in a shared acoustic space with the respective one of the one or more computing devices, wherein the acoustic gaze comprises a direction in which a head and mouth of the user is pointing with respect to the respective one of the one or more computing devices; and selecting one of the one or more computing devices to trigger a voice activated response based on:

an indication from the selected one of the one or more computing devices that the acoustic gaze of the user is directed at the selected one of the one or more computing devices, and an indication from the selected one of the one or more computing devices that the speech of the user originates in the shared acoustic space with the selected one of the one or more computing devices.

19. The method of claim 18, further comprising obtaining, a reverberation time of a respective acoustic space from each of the one or more computing devices to track the respective acoustic space of each of the one or more computing devices.

* * * * *